United States Patent [19]
Huff et al.

[11] 3,919,317

[45] Nov. 11, 1975

[54] TETRAAZOMETHINES

[76] Inventors: Ralph H. Huff, 4435 Woodleigh Lane, Pasadena, Calif. 91103; Henry L. Lee, Jr., 745 Sierra Madre Blvd., San Marino, Calif. 91108

[22] Filed: Sept. 22, 1970

[21] Appl. No.: 74,495

[52] U.S. Cl. ......... 260/566 R; 260/348; 260/471 C; 260/570.6
[51] Int. Cl.² ..................................... C07C 119/00
[58] Field of Search .............................. 260/566 R

[56] References Cited
UNITED STATES PATENTS

| | | | |
|---|---|---|---|
| 3,420,800 | 1/1969 | Haggis | 260/566 R X |
| 3,441,578 | 4/1969 | Dimworth | 260/566 R X |
| 3,598,827 | 8/1971 | Leffingwell | 260/566 R X |

OTHER PUBLICATIONS

Smith, "Open Chain Nitrogen Compounds", Vol. I, pp. 236–244, (1965).

*Primary Examiner*—Gerald A. Schwartz

[57] ABSTRACT

Tetraazomethine and tetrafunctional primary amine curing agents for polyepoxides. The tetraazomethines may be produced by reacting a bisazomethine having a single reactive hydrogen with a diisocyanate or a diepoxy. The tetrafunctional primary amines are produced by hydrolysis of the tetraazomethines.

2 Claims, No Drawings

TETRAAZOMETHINES

BACKGROUND OF THE INVENTION

1. Field of the Invention

This invention relates to novel azomethine compounds useful as curing agents for polyepoxides. More particularly, the invention relates to tetrafunctional azomethines and to a method for producing such compounds by reacting bisazomethines containing a single reactive hydrogen atom with diisocyanate or diepoxy coreactants.

2. Description of the Prior Art

Polyfunctional azomethines are well known curing agents for polyepoxide systems. For example, U.S. Pat. No. 3,291,775 discloses a multitude of such compounds and describes the manner in which the same are utilized as latent curing agents for polyepoxide resins. These materials are generally formed by reacting a compound having two or more primary amine groups with a ketone or aldehyde.

It should be noted that these compounds have been variously designated as ketimines, Schiff bases and polyimines as well as azomethines. In any event, for purposes of this disclosure, the azomethine group is defined as having the following structure:

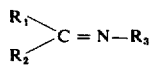

Such groups are formed by the following reaction between a primary amine and a ketone or aldehyde:

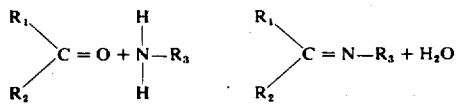

To drive the reaction to completion, the water formed must be removed. Conversely, if water is added to azomethine compounds, the same are readily hydrolyzed to liberate the parent primary amine and ketone or aldehyde. So long as the azomethine groups remain intact, the same will not cause curing of the polyepoxide. However, upon liberation of the primary amine by hydrolysis, curing may commence.

Manifestly, azomethine compounds have great value in that they can be premixed with a polyepoxide resin system which can be stored so long as moisture is excluded. However, upon exposure to atmospheric air the azomethine will be hydrolyzed to release the primary amine. The ketone or aldehyde release will escape into the atmosphere and the primary amine will cure the epoxide system.

Most of the azomethines utilized in the prior art, as exemplified by U.S. Pat. Nos. 3,291,775 and 3,026,285 and British Pat. No. 905,725, are relatively low in molecular weight. Such low molecular weight compounds tend to migrate to the surface of thin coatings prior to reaction with the epoxy resin and remain substantially in an unreacted form as an oily film. Other azomethines, such as certain of the preferred polyimines of U.S. Pat. No. 3,291,775, for example, N,N'-di(2-propylidene) 3-aza-1,5-pentanediamine, N,N'-di(2-butylidene) 3,6-aza-1,8-octanediamine, N,N'-dipropyl 3-aza-1,5-pentanediamine, N,N'-dicyclohexyl 3,6-diaza-1,8-octanediamine, N,N'-dioctyl 3-aza-1,5-pentanediamine, N,N'-di(5-dodecylidene) 2,4-diaza-1,8-octanediamine and N,N'-di(3-butylidene) 2,4,8,10-tetraaza-1,18-octadecanediamine, include secondary amine groups having unreacted active hydrogens. The addition of such compounds to a polyepoxide mixture may often cause a certain amount of relatively uncontrolled thickening by reaction between epoxide radicals and the active hydrogen of the secondary amines. In an attempt to avoid such uncontrolled thickening, it has been proposed to pre-react such active hydrogens with monoepoxide compounds. This, however, is an inefficient usage of the active hydrogen which could, if properly utilized, increase the total functionality of the azomethine molecule.

Another problem encountered because of the presence of secondary amine groups on curing agents is that systems including such curing agents tend to yellow with age.

SUMMARY OF THE INVENTION

The primary object of the instant invention is to provide azomethine compounds wherein the usefulness of all active hydrogen sites is conserved in the development of subsequent cross-linked structures.

Another very important object of the invention is to provide a tetrafunctional azomethine compound wherein the number of unreacted active hydrogens has been minimized, if not substantially eliminated and yet the functionality thereof has been conserved. Thus, a stable molecule is obtained for use in formulating epoxide-curing agent products having reliable handling characteristics. That is to say, because of the absence of active hydrogens, thickening of the epoxide system in the pot is substantially eliminated so that epoxide-curing agent compositions retain their originally selected handling properties. Thus, application procedures, and particularly spraying, do not require substantial manipulation of the compositions properties in the field.

Such a tetraazomethine may be obtained by reacting 2 molecular weights of a bisazomethine having a single reactive hydrogen atom with 1 molecular weight of a difunctional coreactant which is either a diisocyanate compound or a diepoxy compound. Thus, two bisazomethine compounds are linked together to form a tetraazomethine compound and the active hydrogens are pre-reacted in a manner to conserve their usefulness. In the resulting compound, only primary amines are present upon hydrolysis of the tetraazomethine. Thus, set time and tack free time are accelerated. In addition, because of its tetrafunctionality, set time is further accelerated relative to, for example, difunctional primary amine compounds.

The compounds of the instant invention provide means for appropriate adjustment of molecular weights. Thus, molecular weight may be increased to correspondingly decrease the tendency of the compound to migrate to the surface of thin coatings. The diisocyanate or diepoxy compounds utilized may be selected from isocyanate or epoxy terminated resins of pre-selected molecular weight. For example, two molecular weights of a diisocyanate, such as a toluene diisocyanate, may be pre-reacted with 1 molecular weight of a polyalkylene glycol to present an isocyanate terminated reactive resin capable of readily linking bisazomethine compounds having a single reactive hydrogen atom. Similarly, diglycidyl polyethers may be utilized to link two bisazomethines together to present a tetraazomethine in accordance with the present invention.

In general, the tetraazomethine compounds of the present invention may be characterized by the substantial absence of active hydrogens; by the ready hydrolysis thereof to produce tetrafunctional primary amine compounds and relatively volatile ketones or aldehydes; by relatively high, pre-selectable, molecular weights; and by the ease of preparation thereof, for example, by the reaction between bisazomethine compounds having a single reactive hydrogen atom and diisocyanate or diepoxy compounds under atmospheric conditions. Such tetraazomethines are further characterized by their extreme stability in epoxide resin systems so long as moisture is excluded and by non-yellowing capabilities.

The preferred tetraazomethine compounds for purposes of this invention are those which have a relatively high molecular weight and are relatively viscous resinous liquids or if solid, are readily soluble in typical epoxy resin coating systems. Also preferred are those tetraazomethine compounds which yield tetrafunctional primary amine compounds which are liquid or are soluble in typical organic solvents useful in connection with epoxy resins. Generally speaking, such preferred compounds are produced by combining 2 moles of a bisazomethine compound having only a single secondary amine group with 1 mole of a resinous diepoxide or diisocyanate prepolymer.

Other, less desirable compounds which are still however within the contemplation of this invention, are those which are solid and/or insoluble in common organic solvents. Such solid compounds are usable only if ground or powdered and are difficult to control because of the possibility of uneven distribution in the system. These compounds may be obtained by utilizing bisazomethines having more than one active hydrogen and/or polyfunctional epoxide or isocyanate compounds having more than two functional groups.

Difunctional organic acids might also serve to link bisazomethine compounds together. However, such compounds are generally insoluble in the solvents commonly utilized in epoxy systems and are therefor less desirable from a commercial standpoint.

DESCRIPTION OF THE PREFERRED EMBODIMENTS

In its more general aspects, as discussed above, in its preferred form, this invention is directed to tetraazomethines of the type which might be obtained by reacting 2 molecular weights of a bisazomethine having a single reactive hydrogen atom with 1 molecular weight of a coreactant such as a diisocyanate or a diepoxy compound and to the tetrafunctional primary amines obtained by hydrolyzing such tetraazomethines. More specifically, this invention provides tetraazomethines having the following general formula:

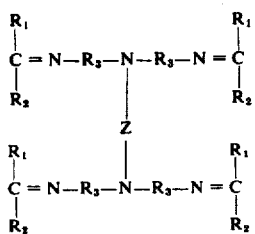

wherein $R_1$ may be a lower alkyl group, $R_2$ may be a lower alkyl group or hydrogen, the radical

may be derived from a relatively volatile aldehyde or ketone, $R_3$ may be a lower alkylene radical and Z is a divalent organic radical connected to its nitrogen atoms through epoxide or isocyanate linkages. Generally speaking, the linking group Z should preferably be characterized by the absence thereon of additional functional groups capable of reacting with the active hydrogens of secondary amines and hydroxyl groups.

A tetraazomethine of the type having a general formula as set forth above, may be produced by reacting 2 molecular weights of a bisazomethine having the following formula

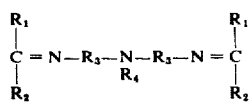

with one molecular weight of a diepoxy or diisocyanate. In the above formula, $R_1$, $R_2$ and $R_3$ all may be as described above. $R_4$ may preferably be either hydrogen or a $-CH_2-CH_2-OH$ radical. However, $R_4$ should be hydrogen whenever a diepoxy is utilized to link the bisazomethine molecules together.

Manifestly, while bisazomethines having a formula as set forth above are preferred, other bisazomethines might well be utilized, the only requirement being that the azomethine groups be produced by reacting primary amines with relatively volatile ketones or aldehydes and that an active hydrogen be present at some position along the molecule whereby two bisazomethine molecules may be linked together by a diepoxy or a diisocyanate.

Various ketones and aldehydes may be utilized to form the azomethine groups. The ketones should contain from 3 to 25 carbon atoms. Examples of specific ketones include, among others, methyl ethyl ketone, dimethyl ketone, diethyl ketone, methyl isobutyl ketone, dibutyl ketone, diisobutyl ketone, methyl isopropyl ketone, ethyl butyl ketone and the like. The aldehydes should contain from 2 to 25 carbon atoms. Examples of these aldehydes include, among others, acetaldehyde, propionaldehyde, butyraldehyde, isobutyraldehyde and the like.

The preferred ketones and aldehydes are those having the following generic formula

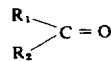

wherein $R_1$ is a lower alkyl group and wherein $R_2$ is a lower alkyl group or hydrogen. Specifically preferred are those compounds wherein the total number of carbon atoms in the molecule is 9 or less such that the compounds are relatively volatile and will evaporate readily from the epoxide system, at atmospheric temperature, upon being released from the azomethines when the latter are hydrolyzed.

The bisazomethines useful in connection with this invention are produced by reacting two molecules of a ketone or aldehyde with a diprimary amine compound. Preferably, the bisazomethine compound will include, in addition to two primary amine groups, a single amino nitrogen. Particularly preferred compounds are dialkylene triamines among which diethylene triamine shows particular utility in connection with this invention. Other biazomethine compounds useful in this invention are known in the art and many are described in U.S. Pat. No. 3,291,775.

The bisazomethines may be connected together with a diepoxide or diisocyanate compound to form the tetraazomethines of the instant invention. Suitable diepoxies can be chosen from a large number of commercially available compounds. An epoxy group reacts cleanly with a secondary amine as follows:

This reaction progresses at or near room temperature in the absence of a catalyst when the epoxy resins are of the glycidyl ether type. Particularly preferred resins are the diglycidyl ethers of bisphenol A which may be represented by the following formula:

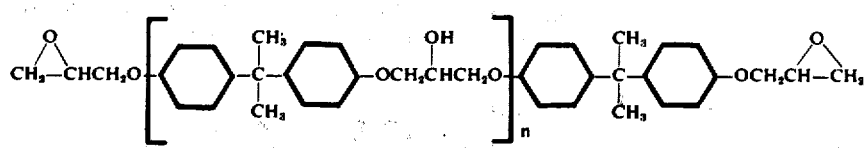

In this case, compounds wherein n ranges from 0 to about 4 are particularly to be preferred. Also suitable are a variety of glycidyl ethers, including, for example, the diglycidyl ether of polypropylene glycol. Aromatic, aliphatic and alicyclic based glycidyl resins may also be employed. However, when alicyclic epoxy groups are present (i.e. those attached to the alicyclic rings) the reaction of the groups with the secondary amine tends to be sluggish and acidic catalysts might be required to increase the speed of the reaction.

Most any organic diisocyanate can be utilized to prepare useful tetraazomethines in accordance with the present invention. Of particular utility are resinous prepolymers containing isocyanate end groups. Specifically to be preferred are resinous prepolymers prepared by reacting 2 molecular weights of a monomeric diisocyanate compounds with 1 molecular weight of a polyalkylene glycol having a molecular weight of 550 or higher. A specifically preferred material is produced by reacting a toluene diisocyanate with a polyalkylene glycol.

Tetraazomethines having particular and specific utility in connection with the present invention are illustrated in the following examples:

EXAMPLE 1

42 grams of N,N'-di(4-methyl-2-pentylidene)-3-aza-1,5-pentane diamine prepared by reacting 2 moles of methylisobutyl ketone and 1 mole of diethylene triamine are mixed in 240 ml. of 2-nitropropane. To this mixture are added, at room temperature, 205 grams of a resinous, isocyanate terminated prepolymer prepared by reacting 2 moles of toluene-2,4-diisocyanate with 1 mole of a poly-1,4-butylene glycol having a molecular weight of approximately 1025. After approximately 15 minutes the temperature rises to about 50°C. After 2 hours, the infrared spectrum of the reaction mixture no longer contains a band for the isocyanate group. The solution is used directly as a slow curing agent for an epoxy resin coating. If 4 ml. of water are added to the solution, a tetraprimary amine is produced providing a much faster curing agent.

EXAMPLE 2

42 grams of N,N'-di(4-methyl-2-pentylidene)-3-aza-1,5-pentane diamine are mixed in 160 ml. of 2-nitropropane. To this mixture are added, at room temperature, 152.4 grams of a resinous, isocyanate terminated prepolymer prepared by reacting 2 moles of toluene-2,4-diisocyanate and 1 mole of a polypropylene glycol having a molecular weight of approximately 600. After approximately 15 minutes the temperature rises to about 55°C. After 2 hours the isocyanate band in the infrared spectrum of the reaction mixture is very small. The solution is used directly as a slow curing agent for an expoxy resin coating. 4 ml. of water may be added to the solution to produce a tetraprimary amine providing a much faster curing agent.

EXAMPLE 3

21.1 grams of toluene-2,4-diisocyanate are added to a solution of 42 grams of N,N'-di(4-methyl-2-pentylidene)-3-aza-1,5-pentane diamine in 60 ml. of 2-nitropropane at room temperature. The temperature of the system rises to 100° C within a few minutes. After 2 hours, the infrared spectrum of the reaction mixture contains only a small band for isocyanate groups. The solution is used directly as a slow curing agent for epoxy resin coatings. However, the tetraprimary amine formed by adding 4 ml. of water to the solution is insoluble in most useful solvents.

EXAMPLE 4

48.3 grams of diglycidyl ether of bisphenol A are added to a solution of 42 grams of N,N'-di(4-methyl-2-pentylidene)-3-aza-1,5-pentane diamine in 240 ml. of 2-nitropropane at room temperature. After the reaction mixture stands for two days, the bands for epoxy groups are no longer discernible in the infrared spectrum of the product. The solution is used directly as a slow curing agent for an epoxy resin coating. When water is added, a faster curing agent is obtained.

EXAMPLE 5

N,N'-di(4-methyl-2-pentylidene)-3-aza-1,5-pentane diamine and ethylene oxide are reacted on a mole per mole basis to add a hydroxyethyl group onto the imino nitrogen atom. Examples 1, 2 and 3 are repeated using 49 grams of this adduct in lieu of 42 grams of the unsubstituted bisazomethine. Similar results are obtained in each instance except that the products are insoluble in many ordinary epoxy resin solutions and therefore must be utilized in powdered form.

Through the use of the present invention, all active hydrogens are utilized efficiently in the ultimate cross-linked epoxy structure. Yet such active hydrogens are pre-reacted to prevent thickening of the resin mixtures in the pot prior to use. Thus, the value of the active hydrogens is conserved while the shortcomings of prior art systems are avoided. In this regard, carefully tailored epoxy resin-curing agent systems can be produced having exact handling characteristics which will not change even during long periods of standing prior to use.

The tetraazomethine compounds of this invention provide curing agents for epoxide systems having a very high functionality. Thus, set times are extremely rapid once the tetrafunctional primary amines have been released.

We claim:
1. A tetraazomethine having the following formula

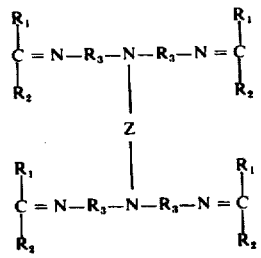

wherein $R_1$ is a lower alkyl group, $R_2$ is selected from the group consisting of $R_1$ and hydrogen, the radical

is derived from an aldehyde or ketones selected from the group consisting of methyl ethyl ketone, dimethyl ketone, diethyl ketone, methyl isobutyl ketone, dibutyl ketone, diisobutyl ketone, methyl isopropyl ketone, ethyl butyl ketone, acetaldehyde, propionaldehyde, butyraldehyde, and isobutyraldehyde and Z has the following structure:

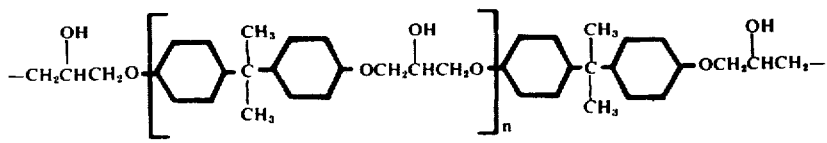

wherein $n$ is an integer from 0 to 4.

2. A tetraazomethine having the following formula

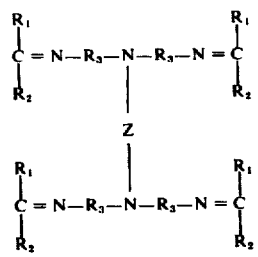

wherein $R_1$ is $-CH_3$, $R_2$ is $-CH_2CH(CH_3)_2$, $R_3$ is $-CH_2CH_2-$, and Z has the structure

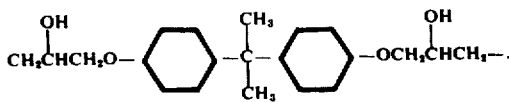

* * * * *